US010767536B2

(12) United States Patent
Morey et al.

(10) Patent No.: US 10,767,536 B2
(45) Date of Patent: Sep. 8, 2020

(54) EFFICIENT MIXING OF GASES IN AN EXHAUST AFTERTREATMENT SYSTEM

(71) Applicant: CNH Industrial America LLC, New Holland, PA (US)

(72) Inventors: Daniel A. Morey, Mundelein, IL (US); Nikolay B. Popov, Elk Grove Village, IL (US)

(73) Assignee: CNH Industrial America LLC, New Holland, PA (US)

( * ) Notice: Subject to any disclaimer, the term of this patent is extended or adjusted under 35 U.S.C. 154(b) by 45 days.

(21) Appl. No.: 15/937,066

(22) Filed: Mar. 27, 2018

(65) Prior Publication Data

US 2019/0301336 A1 Oct. 3, 2019

(51) Int. Cl.
*F01N 3/28* (2006.01)
*F01N 3/20* (2006.01)
*F01N 13/00* (2010.01)

(52) U.S. Cl.
CPC ......... *F01N 3/2892* (2013.01); *F01N 3/2066* (2013.01); *F01N 13/0097* (2014.06); *F01N 13/017* (2014.06); *F01N 2610/02* (2013.01)

(58) Field of Classification Search
CPC .. F01N 2240/20; F01N 3/2066; F01N 13/009; F01N 2610/02; F01N 3/206; F01N 3/2892; Y02T 10/24; B01F 2005/0639; B01F 3/04049; B01F 5/0062; B01F 5/0451; B01F 5/0616
See application file for complete search history.

(56) References Cited

U.S. PATENT DOCUMENTS

| | | | |
|---|---|---|---|
| 3,964,875 A | 6/1976 | Chang et al. | |
| 6,443,255 B1 | 9/2002 | Shavender, Jr. | |
| 7,059,118 B2 | 6/2006 | Ripper et al. | |
| 7,581,387 B2 | 9/2009 | Bui et al. | |
| 8,375,709 B2 | 2/2013 | Salanta et al. | |
| 8,756,923 B2 | 6/2014 | Tamamidis | |
| 8,899,022 B2 | 12/2014 | Haverkamp et al. | |
| 2014/0325967 A1 | 11/2014 | Kimura | |
| 2016/0061078 A1 | 3/2016 | Schmidt et al. | |
| 2018/0112571 A1* | 4/2018 | Oohara | B01D 53/94 |

FOREIGN PATENT DOCUMENTS

WO 2008/061593 A1 5/2008

* cited by examiner

*Primary Examiner* — Anthony Ayala Delgado
(74) *Attorney, Agent, or Firm* — Rickard K. DeMille; Rebecca L. Henkel

(57) ABSTRACT

An inlet for an SCR device including a tube having an upstream end for receiving exhaust gases and a downstream end terminating in a porous wall. A plurality of openings are spaced around the circumference of the tube adjacent the porous wall and a plurality of vanes are formed at a connection junction adjacent one edge of the opening to form vanes extending inward at an acute angle relative to a plane between the connecting junction and the longitudinal axis of the tube. Preferably, the vanes are concave on the surface extending inward to promote more effective mixing.

17 Claims, 4 Drawing Sheets

EFFICIENT MIXING OF GASES IN AN EXHAUST AFTERTREATMENT SYSTEM

BACKGROUND OF THE INVENTION

The present invention relates to exhaust systems for internal combustion engines, and more particularly to a system for decomposing reductant and mixing together reductant and exhaust gas in a selective catalytic reduction (SCR) catalyst device of an exhaust aftertreatment system.

Exhaust aftertreatment systems receive and treat exhaust gas generated from an internal combustion engine such as a diesel engine. Typical exhaust aftertreatment systems include any of various devices configured to reduce the level of unwanted exhaust emissions present in the exhaust gas. Some exhaust aftertreatment systems for diesel powered internal combustion engines include various devices, such as a diesel oxidation catalyst (DOC), particulate matter filter or diesel particulate filter (DPF), and a selective catalytic reduction (SCR) catalyst device. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst devices is configured to perform a particular exhaust emissions treatment operation on the exhaust gas passing through the devices. Generally, the DOC reduces the amount of carbon monoxide and hydrocarbons present in the exhaust gas via oxidation techniques. The DPF filters diesel particulate matter and soot present in the exhaust gas. Finally, the SCR catalyst device reduces the amount of nitrogen oxides (NOx) present in the exhaust gas.

The SCR catalyst device is configured to reduce NOx into N2 and H2O, in the presence of ammonia (NH3). Because ammonia is not a natural byproduct of the combustion process, it must be artificially introduced into the exhaust gas prior to the exhaust gas entering the SCR catalyst device. Typically, ammonia is not directly injected into the exhaust gas due to safety considerations associated with the storage of liquid ammonia. Accordingly, conventional systems are designed to inject a urea-water solution, or diesel exhaust fluid (DEF) into the exhaust gas, which is capable of decomposing into ammonia in the presence of the exhaust gas. SCR systems typically include a urea source and a urea injector or doser coupled to the source and positioned upstream of the SCR catalyst device.

Generally, the decomposition of the urea-water solution into gaseous ammonia occupies three stages. First, urea evaporates or mixes with exhaust gas. Second, the temperature of the exhaust causes a phase change in the urea and decomposition of the urea into isocyanic acid (HNCO) and water. Third, the isocyanic acid reacts with water in a hydrolysis process under specific pressure and temperature concentrations to decompose into ammonia and carbon dioxide (CO2). The ammonia is then introduced at or near the inlet face of the SCR catalyst device, flows through the catalyst, and is consumed in the NOx reduction process. Any unconsumed ammonia exiting the SCR system can be reduced to $N^2$ and other less noxious components using an ammonia oxidation catalyst.

To sufficiently decompose into ammonia, the injected urea must be given adequate time to complete the three stages. The time given to complete the three stages and decompose urea into ammonia before entering the SCR catalyst device is conventionally termed residence time. Some prior art exhaust aftertreatment systems utilize a long tube of a fixed linear decomposition length that extends between the urea injector and SCR catalyst device inlet face. The fixed linear decomposition length of prior art systems must be quite long in order to provide the necessary residence time. Long tubing for urea decomposition often takes up valuable space that could be occupied by other vehicle components and influences the design of the exhaust aftertreatment system. However, shorter decomposition tubes associated with some prior art end-in, end-out and end-in, side-out SCR systems may not provide a sufficiently long residence time to properly evaporate the injected urea.

Additionally, some prior art exhaust aftertreatment systems, particularly those systems that utilize or require in-line or end-to-end or end-to-side devices, do not provide adequate mixing of the urea/ammonia with the exhaust gas. Inadequate mixing results in a low ammonia vapor uniformity index, which can lead to crystallization/polymerization buildup inside the SCR catalyst device or other SCR system devices, localized aggregation of ammonia, inadequate distribution of the ammonia across the SCR catalyst surface, lower NO conversion efficiency, and other shortcomings.

Further, many exhaust aftertreatment systems with end-to-end or end-to-side SCR systems fail to adequately distribute exhaust gas across the inlet face of the SCR catalyst device. An uneven distribution of exhaust gas at the SCR catalyst device inlet can result in excessive ammonia slip and less than optimal NOx conversion efficiency. For example, a low exhaust flow distribution index at the SCR catalyst device inlet results in a lower amount of SCR catalyst surface area in contact with the exhaust gases. The lesser the catalyst surface area in contact with the exhaust gases, the lower the NOx reduction efficiency of the SCR catalyst device.

What is needed in the art is a more efficient mixing of the exhaust gases prior to or at the inlet of the SCR device.

SUMMARY OF THE INVENTION

The present invention seeks to provide apparatus more completely and uniformly mixing exhaust gas components in an exhaust aftertreatment system.

The invention, in one form, is an inlet for exhaust gases to a selective catalytic reduction (SCR) device having a housing for flow through of exhaust gases. The inlet has a tube with a longitudinal axis, an open upstream end receiving exhaust gases and a downstream end terminating in a porous wall. The tube has a plurality of openings spaced around the circumference of the tube adjacent the porous wall. Vanes extend from a connecting junction on the tube that is approximately parallel to the longitudinal axis of the tube inwardly at an acute angle relative to a plane intersecting the connecting junction and the longitudinal axis of the tube.

In another form, the invention is an exhaust aftertreatment system having a housing for a selective catalytic reduction (SCR) device having a generally cylindrical or oval shape with a longitudinal axis and a plurality of catalyst housed therein over which the exhaust flows. An inlet is positioned at the upstream end of the SCR device and is formed from a tube having a longitudinal axis and an upstream open end for receiving exhaust gases and a downstream end terminating in a porous wall. The tube has a plurality of openings spaced around the circumference of the tube adjacent the porous wall. Vanes extend from a connecting junction on the tube approximately parallel to the longitudinal axis of the tube inwardly at an acute angle relative to a plane intersecting the connecting junction and the longitudinal axis of the tube.

One advantage of the present invention is a uniform mixing of DEF with exhaust gases without a significant component intrusion into the housing for the SCR device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
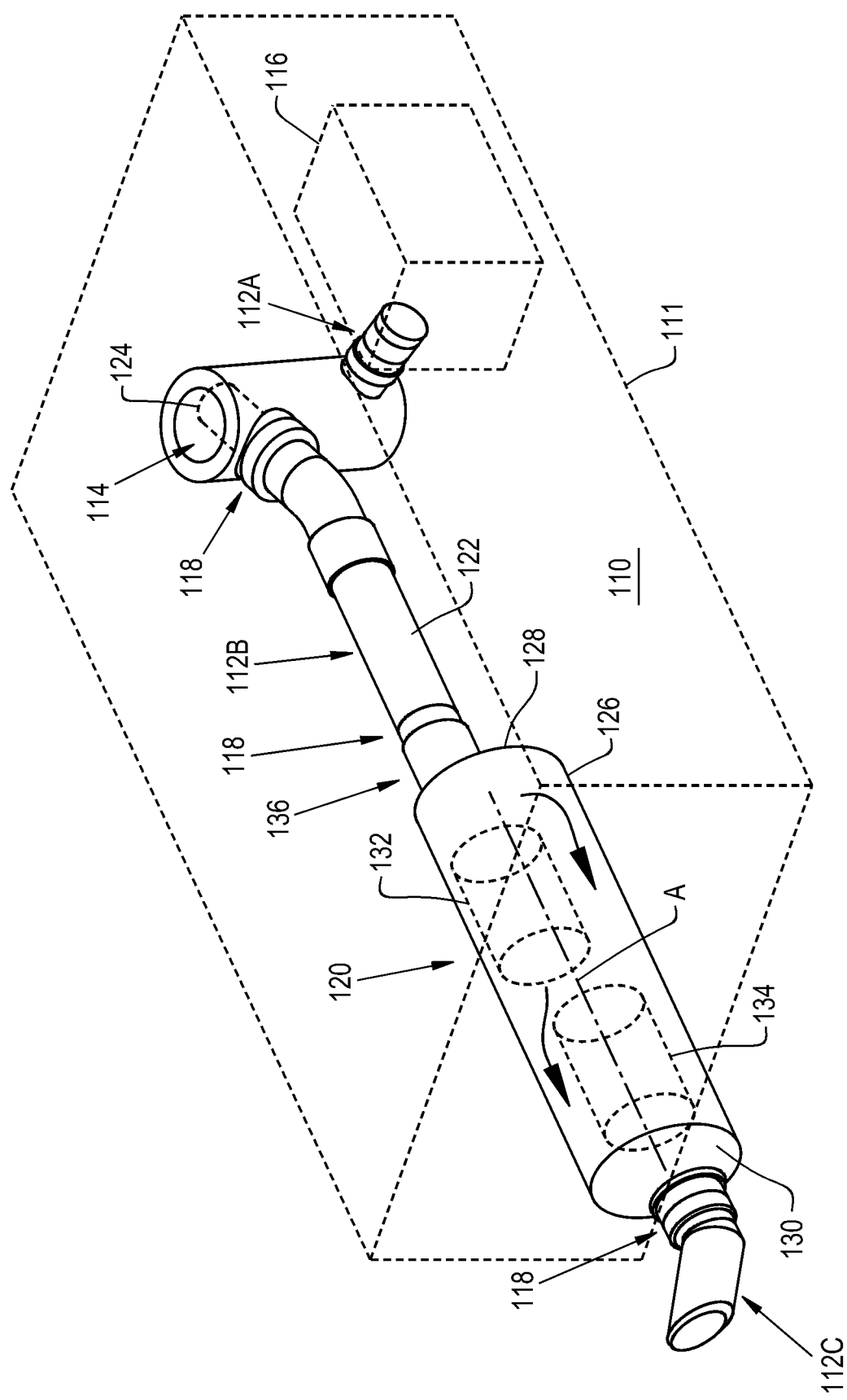
FIG. 1 is a perspective view of an exhaust aftertreatment system incorporating a mixer according to the present invention.

Referring now to the drawings, and more particularly to FIG. 1, there is shown an exhaust aftertreatment system 110 for an agricultural vehicle, such as a combine harvester shown schematically as dashed line 111. The aftertreatment system 110 generally includes exhaust pipe sections 112A, 112B, 112C, a first exhaust aftertreatment device 114 coupled to the exhaust pipe section 112 at a connection point 118, and a second exhaust aftertreatment device 120. Typically, the agricultural vehicle 111 will include additional internal systems for the separation and handling of collected crop material, but these additional systems are omitted from view for brevity of description. It should be appreciated that the aftertreatment system 110 described and illustrated herein does not necessarily need to be included on combine harvesters, but can be incorporated in other industrial vehicles or agricultural vehicles such as windrowers, tractors, etc.

The exhaust pipe 112A may link the exhaust of an engine, shown schematically as 116, to the first aftertreatment device 114, or the exhaust pipe 112 may link multiple aftertreatment devices 114 together. The exhaust pipe section 112B may have an insulation 122 surrounding it. The insulation 122 may extend along a portion or up to the entire length of the exhaust pipe section 112B. As shown, the insulation 122 spans the length of the exhaust pipe 112B and extends approximately up to the connection point 118. The insulation 122 may be in the form of any known insulation that desirably insulates the exhaust pipe section 112B.

The aftertreatment device 114 may be coupled to the exhaust pipe 112A in order to reduce nitrous oxides (NOx) and/or diesel particulate matter (DPM). The aftertreatment device 114 may be in the form of an exhaust gas recirculation (EGR) device, a diesel particulate filter (DPF), a selective catalytic reduction (SCR) device, or a catalytic converter such as a diesel oxidation catalyst (DOC).

The aftertreatment device 114 includes at its outlet section a DEF injection device 124 for injecting diesel exhaust fluid into the exhaust for mixing and reaction with the exhaust stream flowing through exhaust pipe 112B. The resulting gas enters the second exhaust aftertreatment device 120 through the inlet end wall 128 of an outer housing 126 which leads to an outlet end wall 130 connecting with exhaust pipe 112C through connector 118. Outer housing 126 may have a cylindrical or oval cross section shape with a longitudinal axis A.

Exhaust aftertreatment device 120 is an SCR device and it includes a forward SCR catalyst 132 and an aft SCR catalyst 134 oriented in tandem and configured so that parallel exhaust flows pass separately through each of the SCR catalysts 132 and 134. It is important to obtain uniform and complete mixing of DEF with the exhaust gases so that it may allow the systems to properly reduce the oxides of nitrogen. In the event of inadequate mixing or mal-distribution between catalysts 132 and 134, the amount of DEF consumed is increased thereby taking away from the efficiency of the aftertreatment system 110.

Figure 2:
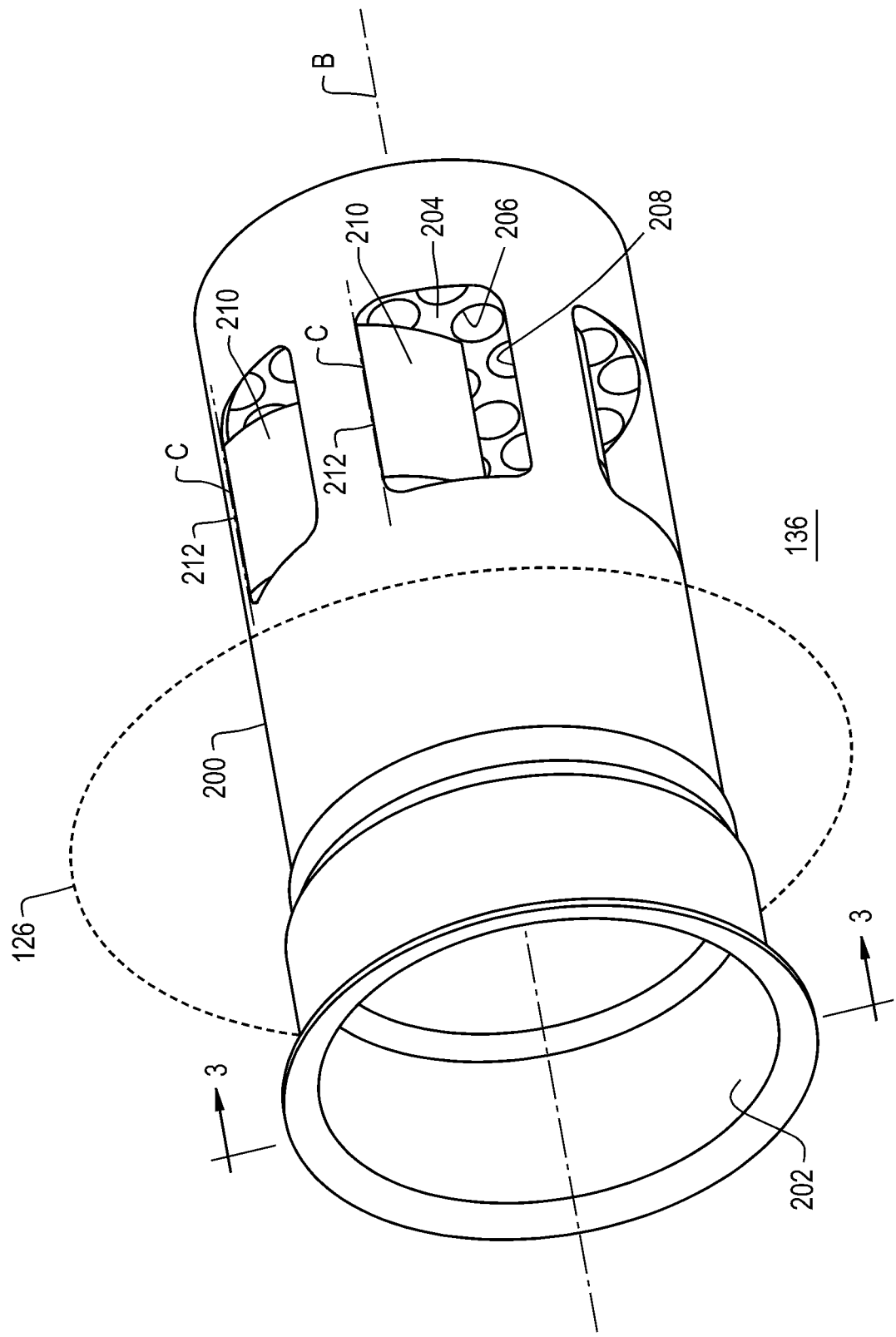
FIG. 2 is an expanded perspective view of an inlet embodying the present invention.

Referring to FIGS. 1 and 2, an inlet 136 is provided for the aftertreatment device 120 to provide efficient and effective mixing in accordance with an aspect of the present invention.

Figure 3:
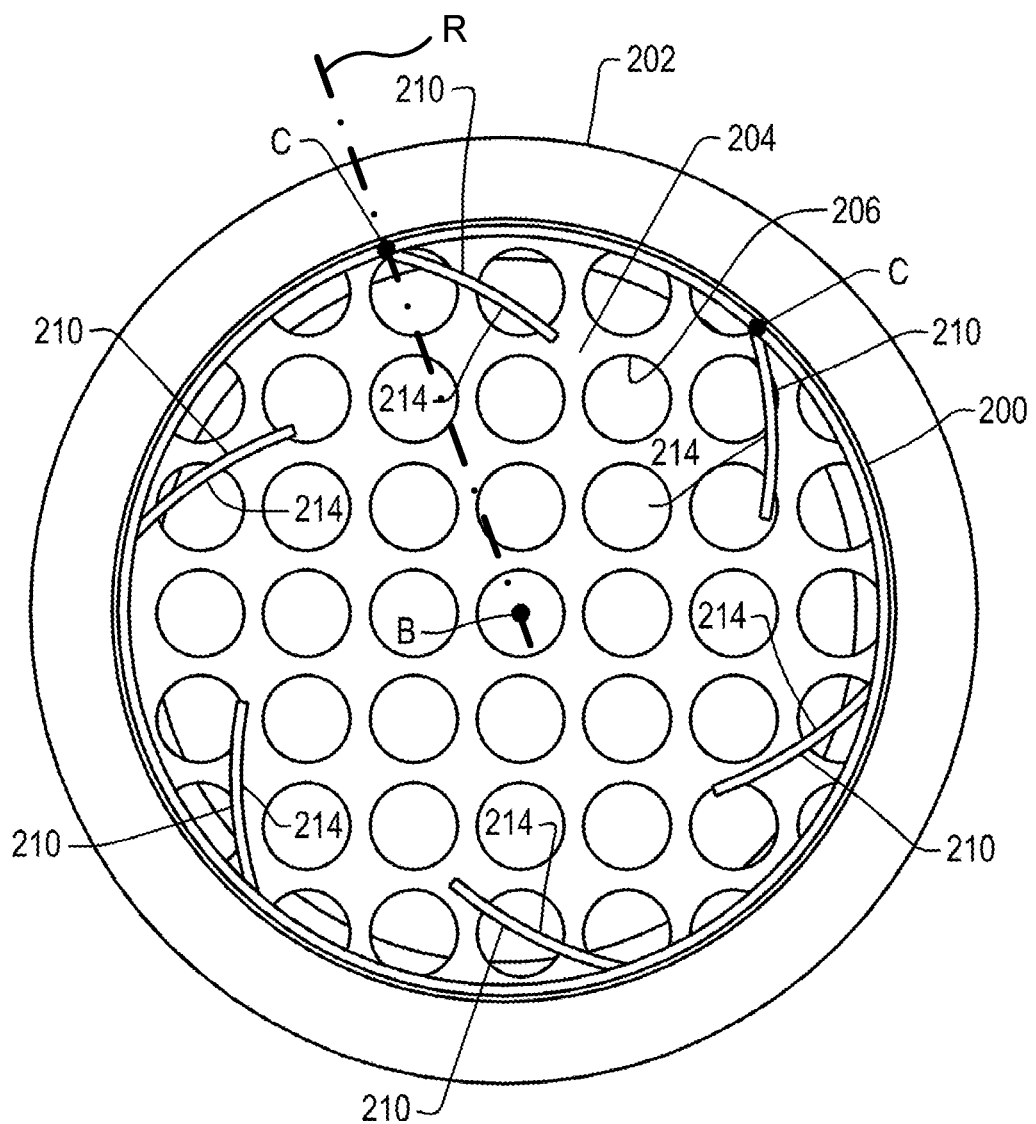
FIG. 3 is an end view of the inlet shown in FIG. 2.

FIG. 2 shows a perspective view of the inlet 136 with adjacent and interacting components in dashed lines. As shown particularly in FIGS. 2 and 3, inlet 136 includes a tube 200 mounted in an upstream wall of the SCR device 120 of the housing 126 for the SCR device 120. Tube 200 terminates in a porous end wall 204. Wall 204 has a plurality of circular openings 206 providing the porosity. The number of circular openings 206 and their area relative to the projected area of end wall 204 may be selected for the particular circumstances and operating cycle. One example may be 50% of the area of porous end wall 204. Tube 200 has an open upstream end 202 connecting with pipe 122 to receive exhaust gases.

Tube 200 has a plurality of openings 208 spaced preferably uniformly around the circumference of the tube 200, shown in a rectangular configuration. Vanes 210, as particularly shown in FIG. 3, extend from a connecting junction 212 at one edge of each opening 208. Connecting junction 212 has an axis C that is approximately parallel to the longitudinal axis B of tube 200. Vanes 210 extend inward at an acute angle relative to a reference plane R intersecting the axis C and longitudinal axis B. The reference plane R is illustrated in connection with one of the connecting junctions 212. It should be understood that it would apply to all the junctions shown in FIG. 3. Although the angle may be any one of a number of angles depending upon the operating conditions, an angle of 30 degrees may be employed. Preferably, vanes 210 have a concave surface 214 facing in an inward direction.

In operation, exhaust gases mix with DEF and pass through tube 112 B into open upstream end 202 of inlet 200. The vanes 210 cause a swirl effect to the exhaust gases which, when combined with the porous end wall 204, causes a more complete mixing of the exhaust gases with the DEF to provide more efficient conversion in the SCR devices. This arrangement provides a significant performance increase over simply providing openings as in prior art devices and it does so without any additional intrusion into the space requirements of the upstream end of the housing 126.

Figure 4:
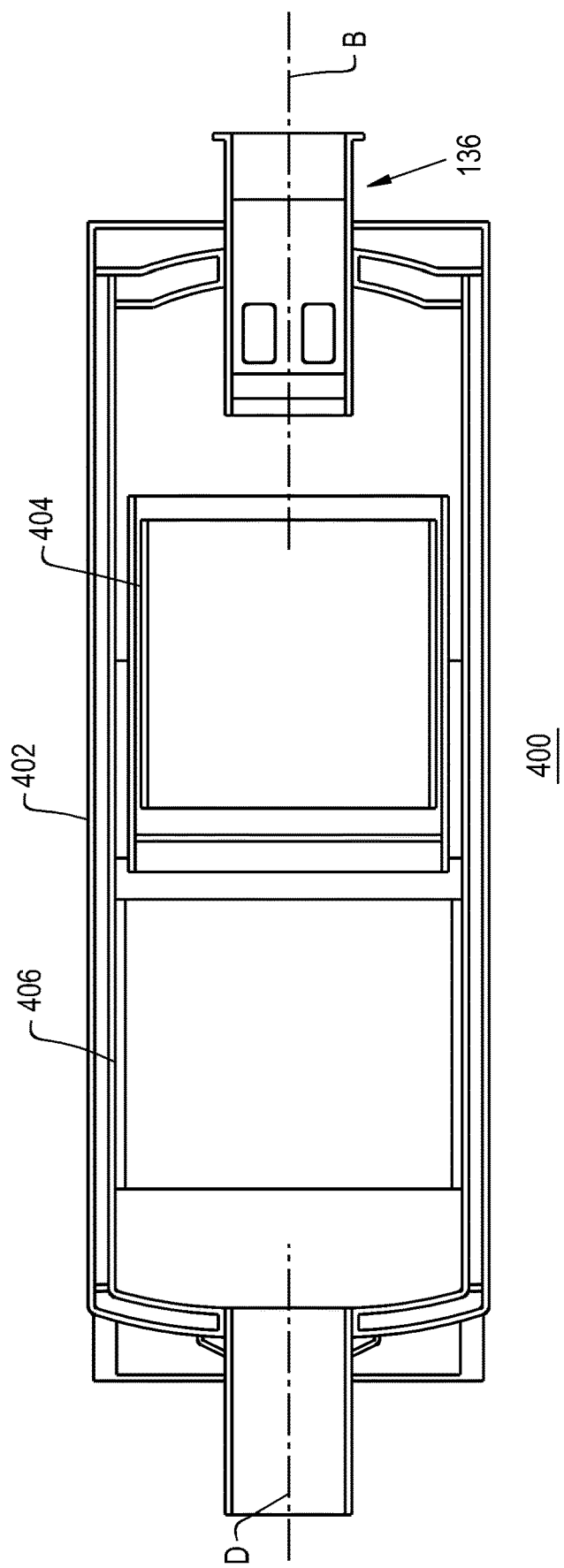
FIG. 4 shows an alternate positioning of the inlet shown in FIGS. 1, 2 and 3.

The arrangement of the emissions control system in FIG. 1 shows a pair of catalyst 132 and 134 offset from one another and providing parallel flow of exhaust gases. In this arrangement the longitudinal axis B of inlet 200 is offset from the longitudinal axis A of the SCR device 120. The arrangement in FIG. 4 shows an SCR device 400 in which catalyst 404 and 406 are arranged in series flow relationship in a housing 402. In this arrangement, the inlet 136 and tube 200 are arranged to be coaxial with the longitudinal axis D of housing 402. In both cases, the inlet 136 provides efficient and compact and complete mixing of exhaust gases with the DEF to provide an overall increase in emissions reduction efficiency.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An inlet for exhaust gases to a selective catalytic reduction (SCR) device having a housing for flow through of exhaust gases, said inlet comprising:
   a tube having a longitudinal axis and an open upstream end receiving exhaust gases and a downstream end terminating in a porous wall;
   said tube having a plurality of openings spaced around the circumference of said tube adjacent to said porous wall; and,
   vanes, each vane extending from a respective connecting junction on said tube inwardly at an acute angle relative to a reference plane intersecting said respective connecting junction and the longitudinal axis of said tube, wherein a longitudinal axis of each connecting junction is substantially parallel to the longitudinal axis of said tube, and wherein said vanes have a concave surface facing radially inward.

2. The inlet as claimed in claim 1, wherein said vanes are integral with said tube.

3. The inlet as claimed in claim 1, wherein said porous wall is formed from a plurality of circular openings.

4. The inlet as claimed in claim 3, wherein said circular openings have an area of up to 50% of the surface area of said porous wall.

5. The inlet as claimed in claim 1, wherein said openings are equally spaced around the circumference of said tube.

6. The inlet as claimed in claim 1, wherein the acute angle said vanes make with respect to said reference plane is substantially 30°.

7. An exhaust aftertreatment system comprising:
   a housing for a selective catalytic reduction (SCR) device, said housing having a generally cylindrical or oval cross section shape with a longitudinal axis;
   a plurality of catalyst housed therein over which the exhaust flows through said housing;
   an inlet comprising a tube having a longitudinal axis and an open upstream end for receiving exhaust gases and a downstream end extending into said housing and terminating in a porous wall, said tube having a plurality of openings spaced around the circumference of said tube adjacent to said porous wall and
   vanes, each vane extending from a respective connecting junction on said tube inwardly at an acute angle relative to a reference plane intersecting said connecting junction and the longitudinal axis of said tube, wherein a longitudinal axis of each connecting junction is substantially parallel to the longitudinal axis of said tube.

8. The exhaust aftertreatment system as claimed in claim 7, wherein said catalysts are in series flow relationship in said housing and the longitudinal axis of said tube is coaxial with the longitudinal axis of said housing.

9. The exhaust aftertreatment system as claimed in claim 7, wherein said catalysts are positioned offset from one another in said housing and in parallel flow relationship, the longitudinal axis of said tube is offset from the longitudinal axis of said housing.

10. The exhaust aftertreatment system as claimed in claim 7, wherein said vanes are integral with said tube.

11. The exhaust aftertreatment system as claimed in claim 7, wherein said vanes have a concave surface facing inward.

12. The exhaust aftertreatment system as claimed in claim 7, wherein said porous wall is formed from a plurality of circular openings.

13. The exhaust aftertreatment system as claimed in claim 12, wherein said circular openings have an area of up to 50% of the surface area of said porous wall.

14. The exhaust aftertreatment system as claimed in claim 7, wherein said openings are symmetrical around the circumference of said tube.

15. The exhaust aftertreatment system as claimed in claim 7, wherein said vanes each form an angle of substantially 30° with respect to said reference plane.

16. An inlet for exhaust gases to a selective catalytic reduction (SCR) device having a housing for flow through of exhaust gases, said inlet comprising:
   a tube having a longitudinal axis and an open upstream end receiving exhaust gases and a downstream end terminating in a porous wall, wherein said porous wall is formed from a plurality of circular openings;
   said tube having a plurality of openings spaced around the circumference of said tube adjacent to said porous wall; and
   vanes, each vane extending from a respective connecting junction on said tube inwardly at an acute angle relative to a reference plane intersecting said respective connecting junction and the longitudinal axis of said tube wherein a longitudinal axis of each connecting junction is substantially parallel to the longitudinal axis of said tube.

17. The inlet as claimed in claim 16, wherein said circular openings have an area of up to 50% of the surface area of said porous wall.

* * * * *